United States Patent
Tsao et al.

(10) Patent No.: US 9,025,900 B1
(45) Date of Patent: May 5, 2015

(54) DISTRIBUTED IMAGE STORAGE USING CLOUD

(75) Inventors: Wen-Kwang Tsao, Shin-I (TW); Kuan-Ru Fu, Kaohsiung (TW); Yu-Kuang Lin, Taipei (TW)

(73) Assignee: Trend Micro Inc., Tokyo (JP)

( * ) Notice: Subject to any disclaimer, the term of this patent is extended or adjusted under 35 U.S.C. 154(b) by 0 days.

(21) Appl. No.: 13/607,565

(22) Filed: Sep. 7, 2012

(51) Int. Cl.
*G06K 9/46* (2006.01)
*G06F 17/30* (2006.01)

(52) U.S. Cl.
CPC .................................. *G06F 17/30247* (2013.01)

(58) Field of Classification Search
None
See application file for complete search history.

(56) References Cited

U.S. PATENT DOCUMENTS

| | | | | |
|---|---|---|---|---|
| 7,333,662 | B2 * | 2/2008 | Okada | 382/240 |
| 7,609,898 | B2 * | 10/2009 | Ma et al. | 382/233 |
| 2001/0033698 | A1 * | 10/2001 | Yip | 382/260 |
| 2002/0039196 | A1 * | 4/2002 | Chiarabini et al. | 358/1.15 |
| 2003/0118241 | A1 * | 6/2003 | Zandi et al. | 382/240 |
| 2004/0033061 | A1 * | 2/2004 | Hughes et al. | 386/124 |
| 2005/0033848 | A1 * | 2/2005 | Croome | 709/227 |
| 2005/0036701 | A1 * | 2/2005 | Miyazawa et al. | 382/240 |
| 2005/0102381 | A1 * | 5/2005 | Jiang et al. | 709/220 |
| 2005/0198208 | A1 * | 9/2005 | Nystrom | 709/219 |
| 2005/0265608 | A1 * | 12/2005 | Suino | 382/233 |
| 2006/0010269 | A1 * | 1/2006 | Leibbrandt | 710/74 |
| 2006/0039469 | A1 * | 2/2006 | Leibbrandt | 375/240.08 |
| 2006/0098937 | A1 * | 5/2006 | Bruls et al. | 386/46 |
| 2007/0025438 | A1 * | 2/2007 | Bruls | 375/240.1 |
| 2007/0109319 | A1 * | 5/2007 | Buckley | 345/611 |
| 2007/0118612 | A1 * | 5/2007 | Buckley et al. | 709/217 |
| 2007/0237409 | A1 * | 10/2007 | Atsumi et al. | 382/239 |
| 2009/0150517 | A1 * | 6/2009 | Atsmon et al. | 709/217 |
| 2011/0019007 | A1 * | 1/2011 | Elazar et al. | 348/207.1 |
| 2011/0258665 | A1 * | 10/2011 | Fahrny et al. | 725/47 |
| 2013/0036155 | A1 * | 2/2013 | Shaw et al. | 709/202 |
| 2013/0046851 | A1 * | 2/2013 | Marcus | 709/217 |

\* cited by examiner

*Primary Examiner* — Sean Motsinger
(74) *Attorney, Agent, or Firm* — Beyer Law Group LLP (57) ABSTRACT

A signal processing transformation (wavelet, Fourier, discrete cosine) is applied to a digital image on a mobile device in order to produce a low-level information image and at least one high-level information image. The low-level image is recognizable as the digital image and is kept on the device; all other related images are deleted. The high-level information images are uploaded. The transformation is applied recursively and is dictated by a default setting, calculated from data of the mobile device, or input. To regenerate the original image the device connects to the server and downloads a set of high-level information images or all sets. The low resolution image is combined with the high-level information images using the reverse of the transformation originally applied to produce a higher resolution version of the low resolution image. Successive sets of high-level information images may be recursively applied to generate successively higher resolution images.

14 Claims, 7 Drawing Sheets

FIG. 1

FIG. 2A
Original Image

Device Database

FIG. 5

Cloud Storage Database

DISTRIBUTED IMAGE STORAGE USING CLOUD

FIELD OF THE INVENTION

The present invention relates generally to digital image storage. More specifically, the present invention relates to distributing high-level and low-level image data to different locations.

BACKGROUND OF THE INVENTION

With mobile telephones and other mobile devices becoming ubiquitous, and the ease with which users may snap photographs with these devices, issues regarding storage capacity, photographic quality, backup and privacy are now more relevant. It can be common for a mobile telephone to reach its storage capacity for photographs and other digital images, requiring a user to spend time deleting previously stored photographs or to forego taking more photographs.

Additionally, while some backup services are available for storing images over the Internet to a cloud-based service, their typical strategy is to back up entire images thus creating privacy issues for the user's photographs. Further, backing up entire images consumes a great deal of network bandwidth. And, for those users who store images from their mobile devices exclusively on a cloud-based server, those images are not available should an Internet connection not be available.

Accordingly, a new strategy for storing digital images from mobile devices is desired. Such a strategy should address memory capacity of mobile devices, photographic quality and privacy of images.

SUMMARY OF THE INVENTION

To achieve the foregoing, and in accordance with the purpose of the present invention, a storage technique is disclosed that distributes different levels of information from a digital image to different locations.

Once a digital image on a mobile device has been transformed into different levels of detail using a suitable transformation algorithm, the low-level details can be kept on the mobile device while the high-level details can be stored remotely on a cloud-based server. The storage capacity of the mobile device is greatly increased because only the low-level details of the digital images are stored upon the device. Since the low-level details of the digital images are stored upon the mobile device, the user is always able to browse his or her entire collection of photographs without needing a network connection (albeit at a low resolution). When a user desires to see the complete high-resolution photograph, he or she may connect to the Internet, download the high-level details to be combined with the low-level details, and then view the original high-resolution photograph. Privacy concerns are addressed because the high-level details of a given photograph stored on the cloud-based server are generally meaningless without the low-level details of that photograph. In addition, lossless transformations are used so that the original image can always be regenerated fully on the mobile device. Further, the user may choose to only download limited sets of high-level details in order to produce an image having a high enough resolution for the device the user is using.

In a first embodiment, a signal processing algorithm is applied to a target digital image on the mobile device in order to produce a low-level information image and at least one high-level information image. The low-level information image is a low resolution image that is recognizable as the target digital image and is kept on the device. The high-level information image (or images) are uploaded to a remote cloud server. The target digital image and all of the high-level information images are deleted from the mobile device in order to save memory space.

In a second embodiment, a signal processing transformation is recursively applied to an original digital image on a mobile device in order to produce successive low-level information images and successive sets of high-level information images. The number of times that the transformation is applied can be a default setting, calculated from data of the mobile device, or input by a user. The final low-level information image is kept on the mobile device and is recognizable by the user as being a low resolution image of the original digital image. All of the high-level information images are uploaded to a cloud storage server. The original digital image can be deleted from the mobile device, as well as any intermediate low-level information image and all of the high-level information images.

In a third embodiment, a higher resolution version of a digital image on a mobile device may be regenerated. The mobile device connects to a remote storage server over the Internet and downloads high-level information images associated with the digital image. Previously, a signal processing transformation had been applied any number of times to an original digital image to produce the current digital image on the mobile device and the high-level information images stored remotely. The digital image is combined with the high-level information images using the reverse of the transformation originally applied in order to produce a higher resolution version of the digital image. Successive sets of high-level information images may be downloaded from the remote server and the reverse transformation may be recursively applied in order to generate successively higher resolution images. If all sets of high-level information images are downloaded and recursively applied then the original digital image will be regenerated.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
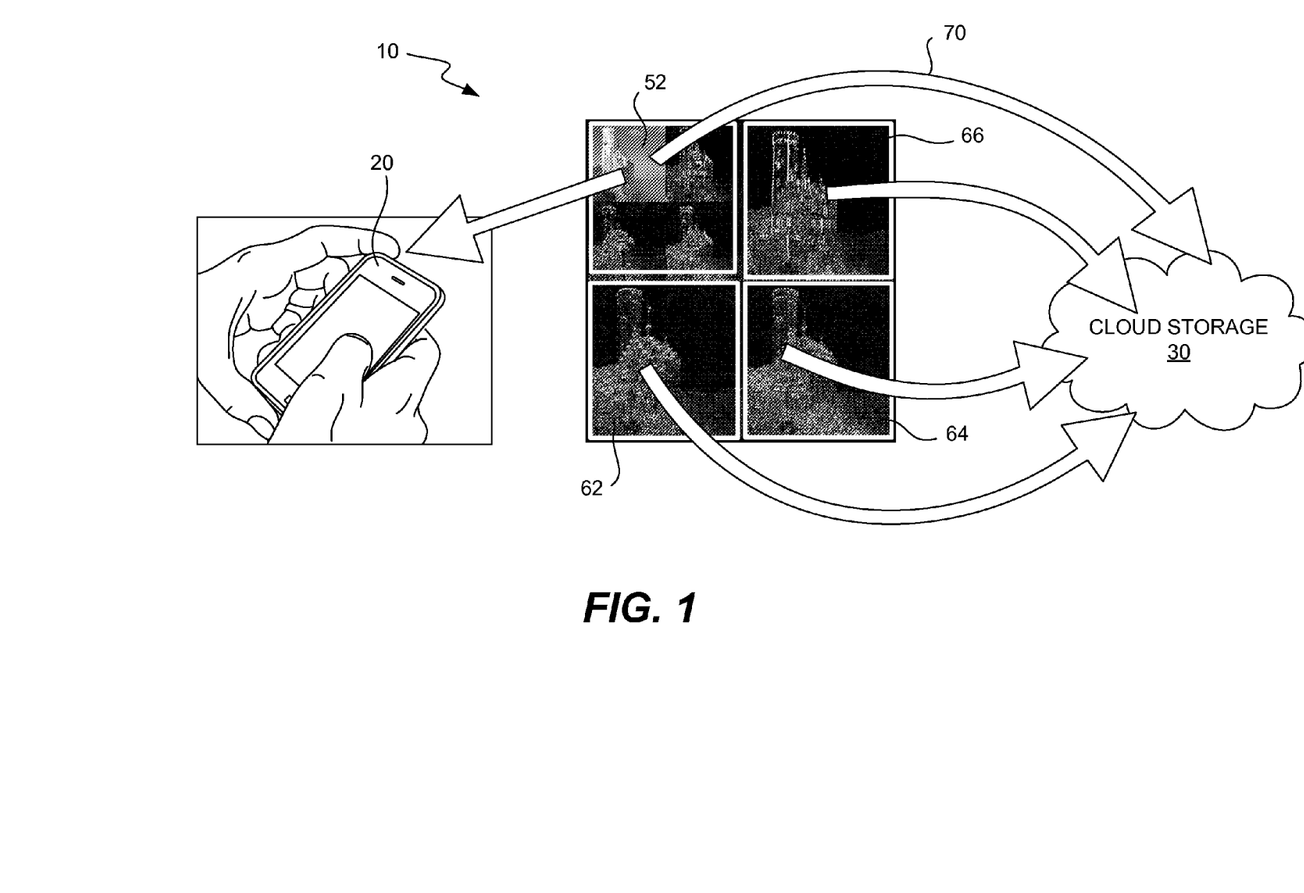
FIG. 1 illustrates one embodiment of a system for distributing different levels of detail of an image to different locations.

FIG. 1 illustrates one embodiment of a system 10 for distributing different levels of detail of an image to different locations. Shown is a mobile computing device 20 being operated by a user. This mobile device may be a mobile telephone (such as a so-called smartphone), a tablet computer, a digital camera, or similar device. In fact, any computing device with limited storage may benefit from the present invention. Cloud storage 30 is any suitable computer server or servers accessible over an Internet connection and is typically located remotely from the mobile device 20. Cloud storage 30 is arranged to store digital images or particular versions of digital images for various users or mobile devices. Cloud storage 30 may be up implemented using any suitable type of computer servers accessible over the Internet such as known services Dropbox, SafeSync available from Trend Micro, Inc., SkyDrive available from Microsoft Corporation, and iCloud available from Apple, Inc.

Images 52, 70 (including the three small images associated with image 52) and 62-66 are transformations of the original image (a higher resolution of image 52) present on the mobile device 20. In a typical situation, the mobile device will have taken a photograph in order to obtain the original image. The image is transformed into different levels of information; low-level information is shown in image 52 while high-level information is shown in images 62-66 and 70. The mobile device will retain the low-level information (image 52), while the high-level information (images 62-66 and 70) will be uploaded to cloud storage 30. In this fashion the user is able to browse photographs on his or her mobile device by viewing the low-level information (which roughly shows the original photograph, albeit at a low resolution), and may choose to download the high-level information from the cloud storage in order to view the original photograph at full resolution. The privacy of the photograph is protected while in the cloud storage because it can be difficult for a human to understand the high-level information.

Figure 2A:
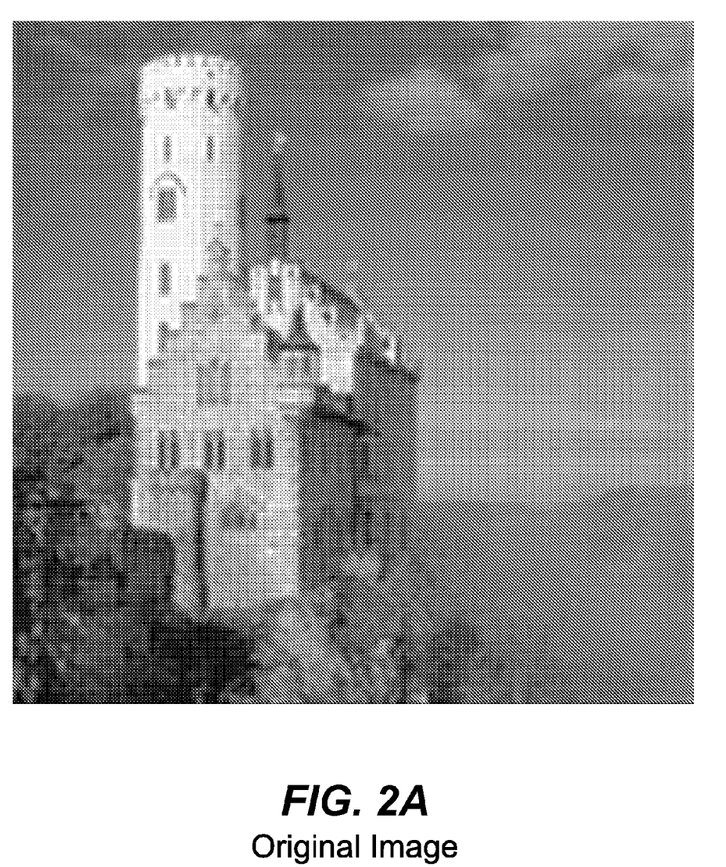
FIG. 2A is an original image of a castle that has been scaled down.
Figure 2B:
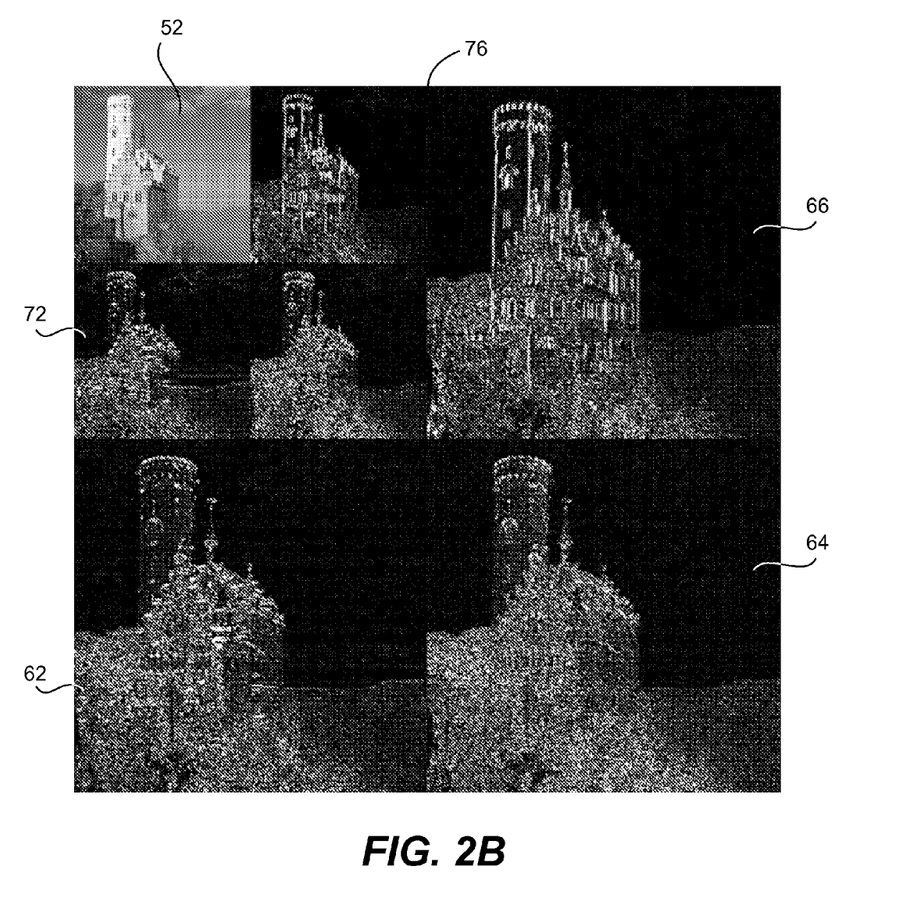
FIG. 2B is an example of the original image of FIG. 2A that has twice undergone a two-dimensional discrete wavelet transform.

FIG. 2A is an original, full resolution image of a castle. The image has been scaled down in size for presentation in this application. FIG. 2B shows images 52, 62-66 and 72-76 in greater detail. These images are publicly available on Wikipedia and were produced by Alessio Damato. As shown, image 52 is clearly an image of the castle, while image 64, for example, is difficult to interpret without prior knowledge of what it is. In fact, someone without prior knowledge of the original image would be hard-pressed to say exactly what image 64 represents, aside from guessing that it shows some type of cylindrical structure. When presented solely with image 64 (or even with images 62, 66 or 72-76), an individual would not be able to say with certainty that it represents a castle on a mountain, that there are trees surrounding it, or that there is a horizon with clouds in the background. In other words, while the low-level information of image 52 is easily understandable by human, the high-level information of images 62-66 and 72-76 is not.

FIG. 2B is an example of the original image of the castle that has twice undergone a two-dimensional discrete wavelet transform (such as that used in the standard JPEG 2000). In this example, the original image (originally the size of FIG. 2B) has undergone the wavelet transform once in order to produce the three high-level information of images 62-66 and the low-level information of a fourth lower resolution image of the castle. This fourth lower resolution image is also not shown, but would normally occupy the space taken up by images 52 and 72-76, and is an image that has a higher resolution than image 52. In order to produce the final images shown in FIG. 2B, this fourth lower resolution image also undergoes the wavelet transform in order to produce the low-level information image 52 and the high-level information images 72-76. Once the transformations are complete, then image 52 may be stored onto the user's mobile telephone while images 72-76 and 62-66 may be uploaded over the Internet to cloud storage 30.

Of course, the process may be reversed using the inverse transform, and images 52 and 72-76 may be combined to produce the fourth lower resolution image. To reproduce the original image, this fourth lower resolution image may be combined with images 62-66, again using the inverse transform. Advantageously, only low resolution image 52 need be stored on the mobile device, saving at least 75% storage space, and image 52 is still easily viewed and understood by a human user.

Flow Diagrams

Figure 3:
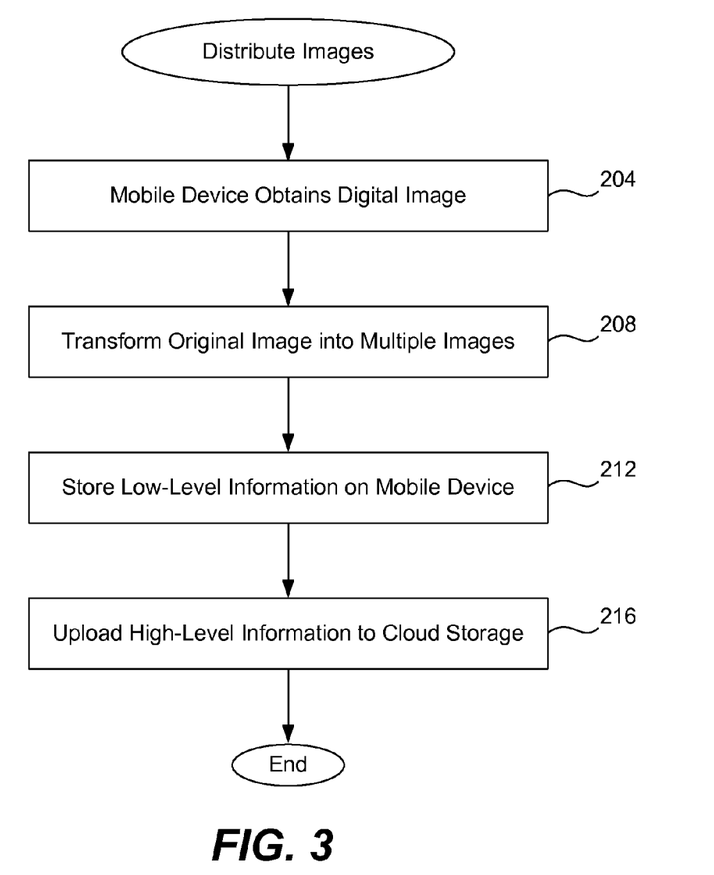
FIG. 3 is a flow diagram illustrating one embodiment of the invention.

FIG. 3 is a flow diagram illustrating one embodiment of the invention. In this flow diagram a digital image on a mobile device is transformed into low-level and high-level information, the low-level information is retained for viewing on the mobile device while the high-level information may be uploaded to cloud storage.

In step 204 the mobile device obtains a digital image. This image may be obtained by taking a photograph using the mobile device, by downloading an image over the Internet, by receiving a text or picture message, by receiving an e-mail message with an attachment, by selecting an image from a video, etc.

In step 208 the mobile device executes an algorithm to transform the original image into at least two images and perhaps multiple images, depending upon the transform used. For example, FIG. 2B shows the results of transforming the original image of a castle into seven resultant images (each transformation produces four resultant images, the fourth low resolution image after the first transformation not shown). In this example the transform was applied twice, although it is possible to apply the transform only once or multiple times. Whether to apply the transform only once or multiple times is an implementation detail and may be determined by a default setting on the mobile device, by requesting input from the user, by calculating how much storage in memory is available, by determining the current resolution of the digital image, or by a combination of all of these factors. For example, if the mobile device is a small, inexpensive mobile telephone with limited memory, then it may be desirable to perform the transformation two or more times because of the limited memory and because the screen on the device is small.

On the other hand, if the mobile device is a larger tablet computer with lots of memory, it may only be necessary to perform the transformation once, one reason being that it would be desirable to have a higher resolution image for display on the larger screen of the tablet computer. In another example, the user may supply input to the device requesting a certain number of transformations depending upon the final resolution desired for the image to be stored on the device. The device may also determine the amount of memory available, and then using a simple algorithm, determine how many transformations should be applied to images to be stored. For example, if less than 1 MB of memory remains on the device, the device may require two more transformations in order to limit the size of images stored. Or, if the image already is fairly low resolution and takes up a certain amount of memory below a threshold, the device may decide that only one transformation is needed. Very high resolution images may cause the device to determine that at least two more transformations may be needed before the final low resolution image is stored. The mobile device may take any or all of these factors into consideration along with input from the user in order to determine the number of transformations to be applied to the digital image.

The transformation to be applied to the digital image is any suitable signal processing transformation that transforms the image into low-level information and high-level information. As known in the art, generating low-level information is similar to performing a low-pass filter of the image, while generating high-level information is similar to performing a high pass filter. In the example of FIG. 2B, the discrete wavelet transform (that is used in JPEG 2000) is used perform a high pass filter of the original image, yielding the large images 62-66, each describing local changes in brightness in the original image. A low-pass filter is also performed on the original image yielding the fourth low resolution image (which is not shown). The wavelet transform is performed a second time on this fourth low resolution image producing (via a high-pass filter) the three smaller high-level information images 72-76 and (via a low-pass filter) the final low resolution image 52.

Other suitable signal processing transformations that may be used include other types of wavelet transforms (not necessarily JPEG 2000), any Fourier transform, the discrete cosine transform (from the original JPEG standard), the Hadamard transform, etc. In general, wavelet transforms work well. Any variants of the above transforms will benefit from the present invention.

It is preferable that the transformation be reversible so that the low-level and high-level images may be combined at a later time in order to produce a higher resolution image or to reduce the original image. It is also preferable that the transformation is lossless in order to recover the original image.

Once the original image has been the subject of a transformation (or numerous transformations) the low-level information may be stored on the mobile device in step 212. In the example of FIG. 2B, image 52 (a low-resolution image having low-level information) is stored in permanent storage upon the mobile device. Preferably, the original image is then deleted from the device in order to free up memory along with any intermediate low-level information images generated during the transformations. Next, in step 216 the high-level information is uploaded over the Internet to cloud storage 30. In the example of FIG. 2B, all of the high-level images 72-76 and 62-66 that have been created by the transformations are uploaded. All high-level images are uploaded in order to regenerate any of the intermediate low-resolution images in addition to the original image at a future time. For example, uploaded images 72-76 can be combined with low resolution image 52 in order to regenerate the fourth low resolution image (not shown), which will have a higher resolution than image 52. And, uploaded images 62-66 can be combined with this regenerated fourth low resolution image in order to re-create the original image. In this fashion, the user or the computing device can be selective about which images to regenerate. For example, a smaller mobile device may only need to regenerate the fourth low resolution image rather than the original image. Once uploaded, all of the high-level information images may be deleted from the mobile device in order to save memory space.

When uploaded, all high-level information images are associated with the original image (or with retained image 52) via a suitable unique identifier. In addition, the high-level information images are associated with their particular transformation, i.e., first transformation, second transformation, etc. For example, images 62-66 are associated with the first transformation (a first set) while images 72-76 are associated with the second transformation (a second set). In this fashion, sets of high-level information images are identified in the cloud storage for use in regenerating any desired higher resolution images on the mobile device. For example, if the user only desires to regenerate an image having slightly higher resolution than image 52 on the mobile device, then only images 72-76 (in the second set) need be downloaded from cloud storage in order to regenerate the fourth low resolution image on the mobile device. Images 62-66 would not need to be downloaded, thus saving time, money and network bandwidth.

Figure 4:
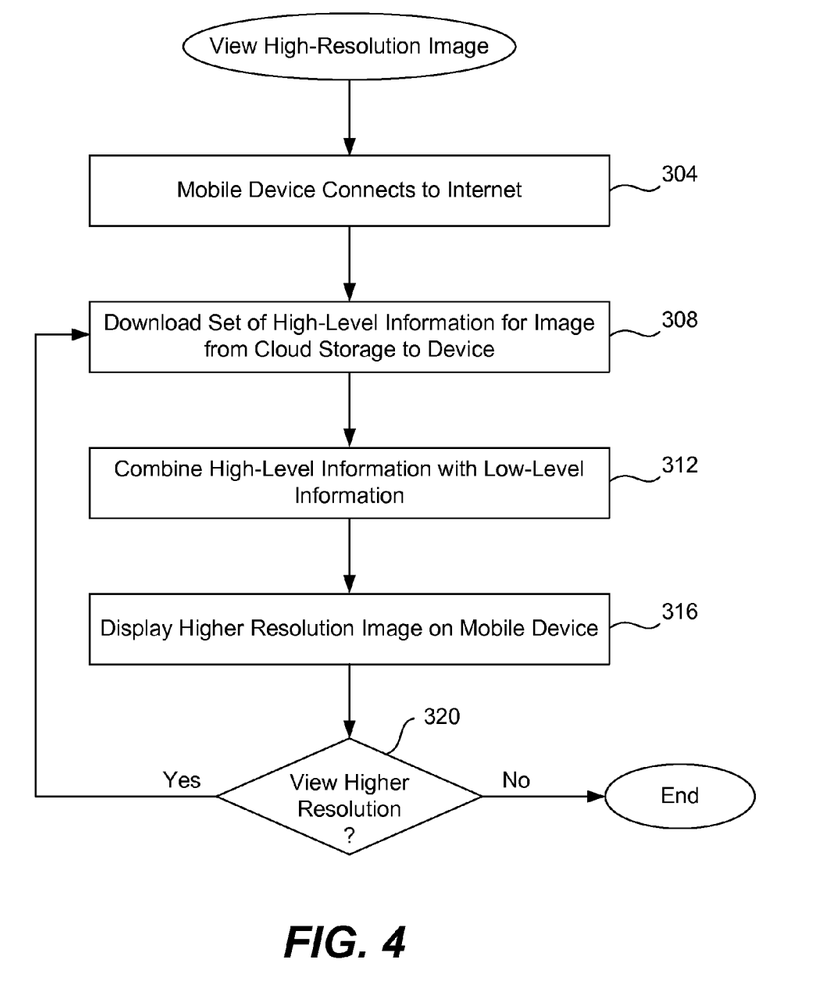
FIG. 4 illustrates another embodiment of the present invention.

FIG. 4 illustrates another embodiment of the present invention. In this embodiment, high-level information retrieved from cloud storage is combined with low-level information on the mobile device in order to create a higher resolution image. In step 304 the mobile device connects to the Internet as the user wishes to download high-level information in order to create a higher resolution image than the one he or she has available on the mobile device. The mobile device will pass to the cloud storage a unique identifier for the image it desires and whether it wishes to retrieve all high-level information, only a first set of high-level information, or any number of sets of high-level information. The mobile device may have a default setting in which all high-level information is always retrieved, or a default setting that only retrieves one set of high-level information at a time.

In step 308 the cloud storage downloads one or more sets of high-level information for the image requested to the mobile device. For example, should the user only wish to slightly improve the resolution of image 52 on the device, then only the first set of high-level information need be downloaded, namely images 72-76. A set may include a single image representing the high-level information, three images representing the high-level information (as in the example of FIG. 2B), or any number of images representing the high-level information depending upon the transform that has been used.

Once the images representing the high-level information have been downloaded to the mobile device, the mobile device then combines this high-level information with the low-level information image that it currently stores. The device will then apply the reverse of the transform it had originally applied (to obtain the high-level and low-level images) in order to obtain a higher resolution image. For example, should images 72-76 be downloaded from cloud storage, these images will be combined with image 52 in order to obtain the fourth low resolution image (that had been created after the first transform had been originally applied). This fourth low resolution image may be enough to satisfy the user's needs, especially if bandwidth is at a premium and the device is small enough that the original image is not needed. One of skill in the art will be able to apply the reverse of the transform initially used in order to obtain higher resolution images.

In step 316 the higher resolution image that has been generated in step 312 is displayed on the mobile device. The user may now view the image and decide whether or not a higher resolution (or the original image) is needed. If not, then the flow ends. If so, then control returns to step 308 and the cloud storage downloads the next set of high-level information to the mobile device. For example, images 62-66 will then be downloaded to the mobile device in order to be combined in step 312 with the fourth low resolution image that had previously been regenerated. This combination will finally result in the original image with no loss of data. The original image may then be displayed.

As mentioned above, the mobile device may have a default setting enabling it to request a certain number of sets of high-level information. Or, the cloud storage may be aware of the type of device that is requesting the high-level information and can then decide how many sets of high-level information to download accordingly. Step 320 may be implemented by requesting input from the user, or may automatically request the next set of high-level information that is appropriate for the type of mobile device. Or, step 308 may automatically download all of the high-level information so that step 312 will be able to regenerate the original image by applying the reverse transform the number of times that the original transform had been applied.

Advantageously, network bandwidth and cost is kept to a minimum for the user because only a minimal number of sets of high-level information may be downloaded if desired. Only one set of high-level information may be downloaded for a small mobile telephone, while all sets of high-level information may be downloaded for a powerful tablet computer or laptop or desktop computer. Finally, because privacy may be a concern for the user when storing image information over the Internet at the cloud storage, the present invention only stores the high-level information at the cloud storage, meaning that any unauthorized party viewing this information will not be able to discern what it is. As previously mentioned, viewing images 62-66 which are stored at the cloud storage will not have any meaning to an unauthorized party who has no a priori knowledge of what the image is. Therefore, privacy concerns of any user using the present invention are addressed.

Figure 5:
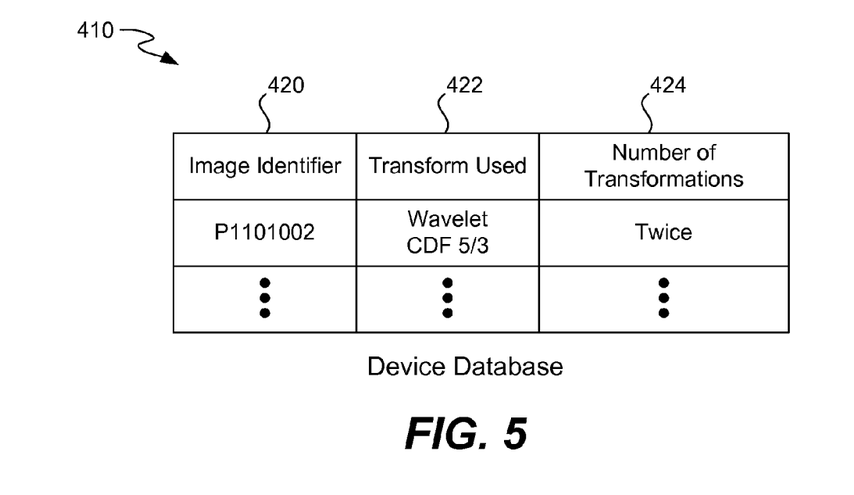
FIG. 5 illustrates a device database that may be present upon the mobile device.

FIG. 5 illustrates a device database 410 that may be present upon the mobile device. As shown, the database includes a first column 420 that holds a unique identifier for an image present on the mobile device. The unique identifier may refer to the original image or to the low resolution image that is retained after a transform is applied. A second column 422 lists the particular transform used on that image. A third column 424 lists the number of transformations that have been applied to the original image in order to obtain the low resolution image present on the device. This database is created in conjunction with the flow diagram of FIG. 3 and may be referred to when regenerating a high-resolution image in conjunction with the flow diagram of FIG. 4. Of course, this database may also be saved into the cloud storage and downloaded or referred to as needed.

Figure 6:
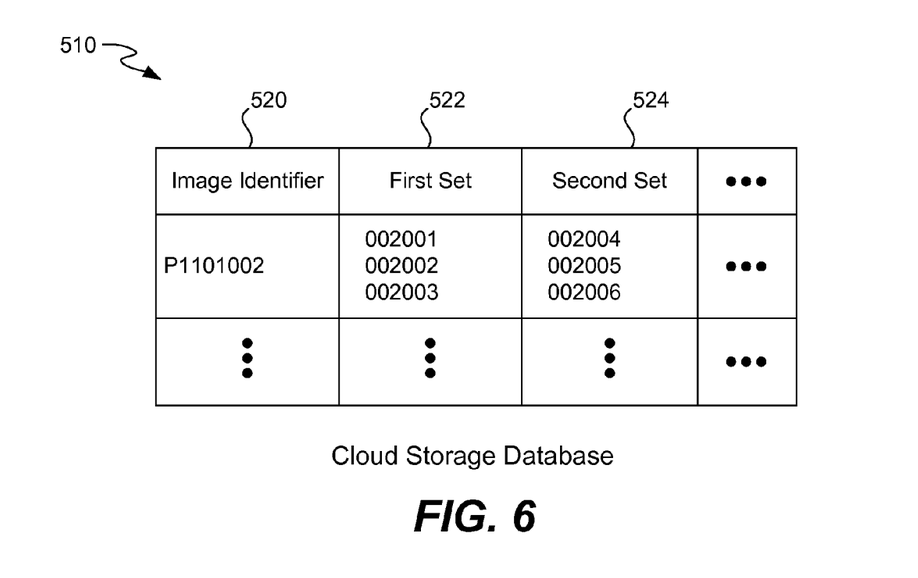
FIG. 6 is a cloud storage database useful for retrieving relevant sets of high-level information for a particular image requested by the mobile device.

FIG. 6 is a cloud storage database 510 useful for retrieving relevant sets of high-level information for a particular image requested by the mobile device. As shown, a first column 520 lists a unique identifier for an image whose corresponding high-level information is stored in the cloud storage. A second column 522 lists unique identifiers for images corresponding to a first set of high-level information stored in the cloud storage. A third column 524 lists unique identifiers for images corresponding to a second set of high-level information stored in the cloud storage. Using this database, the cloud storage will be able to respond to a request for sets of high-level information from a mobile device. For example, should the mobile device require a first set of high-level information for image P1101002, the cloud server may refer to the three unique identifiers in column 522 in order to return images 72-76 to the mobile device. In a similar fashion, the second set of images may be downloaded to the mobile device using the unique identifiers found at column 524. Of course, there may be any number of columns including sets of information depending upon the number of transformations used for a particular image.

Computer System Embodiment

Figure 7A:
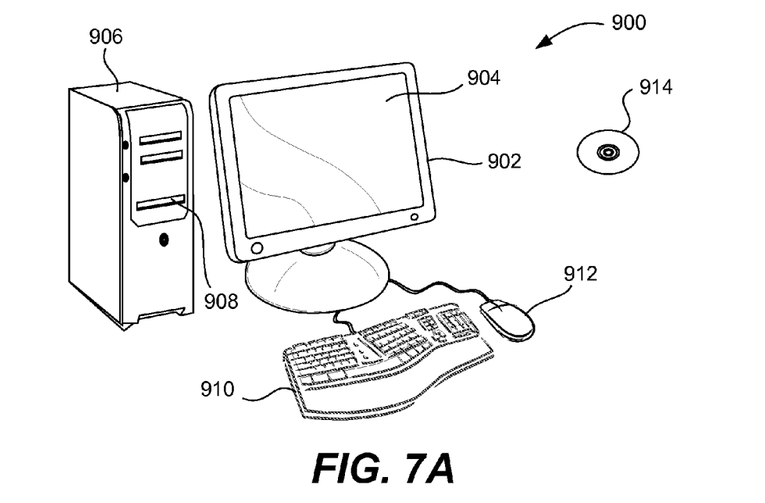
FIGS. 7A and 7B illustrate a computer system suitable for implementing embodiments of the present invention.
Figure 7B:
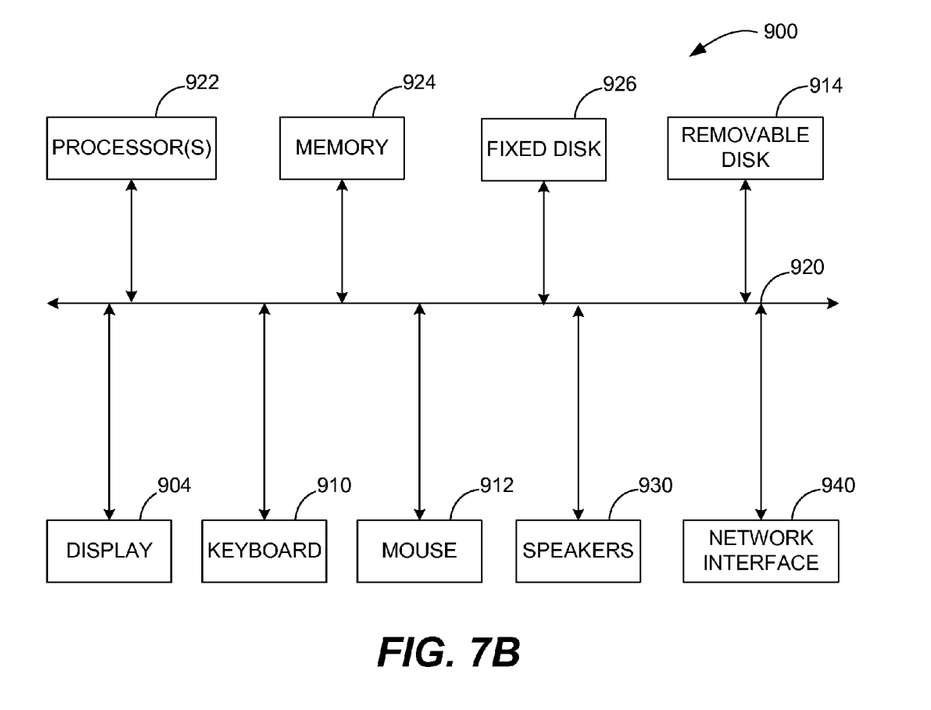

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:

1. A method of securely reducing memory requirements for storing images on a mobile device, said method comprising:
   identifying a digital image on a mobile computing device having a processor, a memory, and a display;
   executing, on said mobile computing device, a signal processing algorithm in order to transform said digital image into a low-level information image and a set of at least three high-level information images, said low-level information image being a lower resolution than said digital image and being recognizable by a human as said digital image and wherein said set of high-level information images is not recognizable by a human as said digital image without a priori knowledge of said digital image;
   deleting said digital image from said mobile computing device;
   storing said low-level information image in persistent storage of said mobile computing device, wherein said low-level information image uses less memory space than said digital image;
   uploading said set of high-level information images from said mobile computing device over the Internet to a remote storage server of a cloud server to store said set of high level information images in a cloud storage database comprising a unique image identifier and with at least one additional unique identifier for each member of the set of high-level information images for said digital image;
   deleting said at least one high-level information image from said mobile computing device;
   saving image identification information in said mobile device to request said set of said high-level information from said remote server of said cloud storage to be combined with said low-level information image to create an image having a higher resolution than said low-level image;
   requesting said set of high-level information from the remote storage server of said cloud storage, including providing to the cloud storage the at least one unique image identifier;
   receiving said set of high level information images from the cloud storage;
   combining, in said mobile computing device, said low-level information image with said set of high level information to create an image having a higher resolution than said low-level image; and
   displaying said higher resolution image on said mobile computing device.

2. The method as recited in claim 1, wherein the set of high level images consists of three high level information images and the cloud server database stores three unique identifiers to provide one unique identifier for each of the three high level information images.

3. The method as recited in claim 1, further comprising saving into said persistent storage of said mobile computing device in association with said low-level information image an identification of said signal processing algorithm and the number of times said algorithm has been applied to said digital image.

4. The method as recited in claim 1, wherein said algorithm uses a low-pass filter to create said low-level information image and uses a high-pass filter to create said at least one high-level information image.

5. The method as recited in claim 1, wherein said signal processing algorithm is a reversible, lossless algorithm.

6. The method as recited in claim 1, wherein said signal processing algorithm is a wavelet-based algorithm.

7. A method of distributing images, said method comprising:
   identifying a digital image on a mobile computing device having a processor, a memory, and a display;
   recursively executing a signal processing algorithm, on said mobile computing device, in order to transform said digital image into a first sequence of low-level information images and a second sequence of high-level information images, each image in said first sequence being of a lower resolution than a previous image in said sequence and being recognizable by a human as said digital image and wherein each image in said second sequence of high-level information images is not recognizable by a human as said digital image without a priori knowledge of said digital image;
   deleting said digital image from said mobile computing device;
   deleting all of said images in said first sequence from said mobile computing device except for a final image of said first sequence;
   storing said final image in persistent storage of said mobile computing device, wherein said final image uses less memory space than said digital image;
   uploading said second sequence of high-level information images from said mobile computing device over the Internet to a remote storage server of a cloud storage having a cloud storage database to store said second sequence of high-level images with the database including a unique image identifier for the digital image and an individual unique identifier for each member of said second sequence of high-level information images;
   deleting said second sequence of high-level information images from said mobile computing device;
   requesting said second sequence of high-level information from the remote storage server of said cloud storage; and
   combining, in said mobile computing device, said final image of said first sequence with said second sequence of high-level images to create an image having a higher resolution than said low-level image.

8. The method as recited in claim 7, wherein the second sequence includes three high level images and the cloud server database stores three unique identifiers to provide one unique identifier for each of the three high level images.

9. The method as recited in claim 7, wherein said algorithm uses a low-pass filter to create said low-level information images and uses a high-pass filter to create said high-level information image.

10. The method as recited in claim 7 wherein said signal processing algorithm is recursively applied by applying said algorithm to the low-level information image produced by the previous application of said algorithm.

11. The method as recited in claim 7 wherein said signal processing algorithm is a reversible, lossless, wavelet-based algorithm.

12. A method of securely reducing memory requirements for storing images on a mobile device, said method comprising:
- identifying a digital image on a mobile computing device having a processor, a memory, and a display;
- executing, on said mobile computing device, a signal processing algorithm in order to transform said digital image into a low-level information image and a plurality of sets of at least three high-level information images, said low-level information image being a lower resolution than said digital image and being recognizable by a human as said digital image and wherein said at least one high-level information image of each of said plurality of sets is not recognizable by a human as said digital image without a priori knowledge of said digital image;
- deleting said digital image from said mobile computing device;
- storing said low-level information image in persistent storage of said mobile computing device, wherein said low-level information image uses less memory space than said digital image;
- uploading each of said plurality of sets of high-level information images from said mobile computing device over the Internet to a remote storage server of a cloud storage to store said at least one high-level information image of each of said plurality of sets in a cloud storage database, the cloud storage database including a unique image identifier with each set of at least three high-level information images provided a unique identifier for each individual high-level information image;
- deleting said at least one high-level information image from said mobile computing device;
- saving image identification information in said mobile device to request one or more of said sets of said high-level information from said remote server of said cloud storage to be combined with said low-level information image to create an image having a higher resolution than said low-level image;
- requesting one or more of said sets of high-level information from the remote storage server of said cloud storage, including providing to the cloud storage the unique image identifier;
- receiving one or more sets of high level information image from the cloud storage wherein a number of sets is determined by the remote server based on the at least one unique image identifier;
- combining, in said mobile computing device, said low-level information image with said one or more set of high level information to create an image having a higher resolution than said low-level image; and
- displaying said higher resolution image on said mobile computing device.

13. A method of securely reducing memory requirements for storing images on a mobile device, said method comprising:
- identifying a digital image on a mobile computing device having a processor, a memory, and a display;
- executing, on said mobile computing device, a signal processing algorithm in order to transform said digital image into a low-level information image and a plurality of sets of high-level information images with each set having three high-level information images, said low-level information image being a lower resolution than said digital image and being recognizable by a human as said digital image and wherein said at least one high-level information image of each of said plurality of sets is not recognizable by a human as said digital image without a priori knowledge of said digital image;
- deleting said digital image from said mobile computing device;
- storing said low-level information image in persistent storage of said mobile computing device, wherein said low-level information image uses less memory space than said digital image;
- uploading each of said plurality of sets of high-level information images from said mobile computing device over the Internet to a remote storage server of a cloud storage to store said at least one high-level information image of each of said plurality of sets in a cloud storage database, the cloud storage database including a unique image identifier with each set of three high-level information images to provide a unique identifier for each individual high-level information image;
- deleting said at least one high-level information image from said mobile computing device;
- saving image identification information in said mobile device to request one or more of said sets of said high-level information from said remote server of said cloud storage to be combined with said low-level information image to create an image having a higher resolution than said low-level image;
- requesting one or more of said sets of high-level information from the remote storage server of said cloud storage, including providing to the cloud storage the unique image identifier;
- receiving one or more sets of high level information image from the cloud storage wherein a number of sets is determined by the remote server based on the at least one unique image identifier;
- combining, in said mobile computing device, said low-level information image with said one or more set of high level information to create an image having a higher resolution than said low-level image; and
- displaying said higher resolution image on said mobile computing device.

14. A method of viewing an image, said method comprising:
- determining an identifier of a digital image on a mobile computing device having a processor, a memory, and a display, said digital image having been previously computed from an original digital image using a signal processing transformation performed on said mobile computing device, said digital image being of lower resolution and using less memory space than said original digital image;
- connecting said mobile computing device over the Internet to a remote storage server of a cloud storage having a cloud database to store a sequence of high level information images of the digital image having a plurality of sets in which each set includes three high level information images, the cloud database storing a unique image identifier for said digital image and for each set storing an individual unique identifier for each high level information image of the set;
- downloading a first set of at least one high-level information image from said remote storage server to said mobile computing device, said at least one high-level information image having been previously computed from said original digital image using said signal processing transformation;
- combining, in said mobile computing device, said digital image with said first set of at least one high-level information image using the reverse of said signal processing transformation to produce an intermediate digital image that is of higher resolution than said digital image;

accepting input from a user of said mobile computing device so that said steps of downloading and combining are performed in a recursive fashion, said intermediate digital image becoming progressively of higher resolution, until said reverse of said signal processing transformation produces said intermediate digital image that is acceptable to said user; and displaying said intermediate digital image on said mobile computing device.

\* \* \* \* \*